United States Patent [19]
Franz et al.

[11] Patent Number: 5,124,689
[45] Date of Patent: Jun. 23, 1992

[54] INTEGRATED KEYBOARD AND POINTING DEVICE SYSTEM

[75] Inventors: Patrick J. Franz, Portland; David H. Straayer, Colton, both of Oreg.

[73] Assignee: Home Row, Inc., Clackamas, Oreg.

[21] Appl. No.: 412,680

[22] Filed: Sep. 26, 1989

[51] Int. Cl.$^5$ .................................................. G09G 3/02
[52] U.S. Cl. ...................................... 340/711; 340/709; 340/706; 400/485
[58] Field of Search ............... 340/706, 709, 710, 711, 340/712; 400/485, 489; 74/471; 364/709.11, 709.12, 709.14, 709.15; 178/18; 341/23, 22; 200/6 A

[56] References Cited

U.S. PATENT DOCUMENTS

| | | | |
|---|---|---|---|
| 4,201,489 | 5/1980 | Zapp | 400/485 |
| 4,680,577 | 7/1987 | Straayer et al. | 349/611 |
| 4,712,101 | 12/1987 | Culver | 340/710 |
| 4,736,191 | 4/1988 | Matzke et al. | 340/709 |
| 4,786,895 | 11/1988 | Castaneda | 340/709 |
| 4,924,433 | 5/1990 | Hirata et al. | 340/709 |
| 4,974,183 | 11/1990 | Miller | 364/709.12 |

FOREIGN PATENT DOCUMENTS 0365305 10/1989 European Pat. Off.
62-279419 5/1988 Japan.
WO81/02272 8/1981 PCT Int'l Appl.

OTHER PUBLICATIONS

IBM Technical Disclosure Bulletin "Compact Computer Keyboard", 3-1985, vol. 27, No. 10A, pp. 6540-5642.

Osiris Technologies, Inc., *OmniPoint TM Embedded Cursor Control,* Nov. 1988.

S. Card, et al. "Evaluation of Mouse, Rate-Controlled Isometric Joystick, Step Keys, and Test Keys for Text Selection on a CRT," *Ergonomics,* 1978 vol. 21, No. 8, 601-613.

Borlund International, Inc. *Turbo Pascal version 3.0 reference manual,* 1985, pp. 22-25.

IBM Corp., 700 *IBM Technical Disclosure Bulletin,* Oct. 31, 1988, vol. 31, No. 5, pp. 276-277.

*Primary Examiner*—Jeffery A. Brier
*Assistant Examiner*—R. Liang
*Attorney, Agent, or Firm*—Marger, Johnson, McCollom & Stolowitz Inc.

[57] ABSTRACT

A computer system employs an integrated keyboard and pointing device to allow user input of alpha-numeric (typing) information, pointing direction information and pointing event information without moving the users's hands from the usual typing position on the keyboard. The new system has typing and pointing modes of operation. In the pointing mode, preassigned keyswitches are used to input pointing events, cursor speed changes, and other modifications to the system's operation. All such modifications are transparent to the operating system and application software because they are processed at keyboard interrupt level.

9 Claims, 16 Drawing Sheets

Prior Art

Prior Art

Prior Art

Prior Art

INTEGRATED KEYBOARD AND POINTING DEVICE SYSTEM

BACKGROUND OF THE INVENTION

The QWERTY keyboard is entrenched as the preferred device for typing alpha-numeric data into a computer. Various apparatus and methods are known for pointing operations, such as selecting text, on a CRT display. Devices for that purpose include the mouse, joystick, step keys and text keys. Keyboards are known which include a joystick, joydisk or other pointing device mounted on the keyboard. However, a separate mouse has been shown to be the most effective pointing device with respect to operating time, error rate and the like. This accounts for its widespread acceptance in the computer industry.

Use of a conventional keyboard and a discrete mouse for entering typing and pointing information, respectively, into a computer require physical and mental disruptions that significantly reduce a user's productivity. For example, typing on a keyboard and pointing with a mouse require the user frequently to move the hands back and forth between the keyboard and the mouse. One research paper reports that it takes about 0.36 seconds to move a hand from the keyboard onto a mouse and additional time to adjust the grasp for operating the mouse buttons. Time to return to the keyboard must be considered as well. The data suggests that the total time spent moving to and from the mouse is greater than one second per occurrence. See S. K. Card, et al, "Evaluation of Mouse, Rate-Controlled Isometric Joystick, Step Keys, and Text Keys for Text Selection on a CRT" (Xerox Palo Alto Research Center), published in *Ergonomics*, Vol.2, No.8, 601–613 (1978).

These movements between keyboard and mouse are disruptive physically because of the distances and side to side arm motions typically required. These movements are disruptive mentally because of the time the movements take, because of the dramatic shift in physical activity (typing on a keyboard is very unlike pointing with a mouse), and because of many mental and physical steps required to perform the movements. Each additional step requires physical and mental effort and is an opportunity for error.

U.S. Pat. No. 4,712,101 describes a cursor positioning device which may be positioned on a keyboard below the space bar. Such a device has been announced under the trade name Isopoint. The Isopoint device includes a finger or thumb actuated roller coupled to a rotary-shaft encoder for indicating position change in a first direction. The roller rests in a sliding cradle which drives a second encoder. Such a device is awkward to operate, especially for diagonal cursor movement, because of the required combination of rolling and sliding actions. Additionally, the sliding cradle has fixed end points which impose discontinuities in its operation.

Another pointing device which can be embedded into a conventional keyboard for cursor control is the OmniPoint TM cursor controller, announced by Osiris Technologies, Inc., Nevada City, Calif. Omnipoint essentially includes a miniature joystick and associated interface electronics. The joystick may be mounted in a keyboard adjacent the standard array of keys. Its use of course requires moving the hand away from the usual typing position.

Both the Isopoint and Omnipoint devices include an embedded switch so that the user can press the device downward (into the keyboard) to emulate a mouse button "click" or dragging operation. Such devices therefore can emulate at best only a single button mouse.

U.S. Pat. No. 4,680,577 to Straayer, et al. shows a multipurpose keyswitch disposed within a keyboard array for controlling cursor movement on a CRT display and for character entry. One of the standard alpha keys is replaced with the multipurpose keyswitch. An additional keyswitch is suggested for activating the cursor positioning capabilities of the multipurpose keyswitch. The '577 patent does not disclose a practical way to implement and use such a system. Additionally, that patent does not address how to input any pointing event information, for example mouse button actions ("clicking"), so that system cannot substitute for a mouse. What is needed is a practical method of allowing a user to type and point without moving the hands away from the usual typing position and without dramatically changing the physical activity.

Prior art methods of pointing and typing assumed these disruptions and incorporated them as limitations in computers, keyboards, pointing devices, and software. Typing and pointing were perceived as distinct and irreconcilable activities.

As a result, there is considerable duplication of hardware and software. For example, the buttons on a mouse are required because pointing has been perceived as very different, mentally and physically, from typing. Since pointing is so different, the hardware and software are duplicated, reinforcing the separation. For example, the buttons on a mouse are duplications because there are plenty of keys on the keyboard that generally are not being used while the mouse is being used. What is needed is a pointing device system that eliminates the restrictions and the duplications of present systems, while maintaining the same software interface to application programs for complete compatibility.

Many known pointing devices also have physical limitations on the number of buttons they can have. These limitations severely limit the range of actions the user can take while pointing. One commercial product that attempts to add additional buttons, called the PowerMouse 100, integrates a two-button mouse with forty programmable keys, resulting in a large, cumbersome device that is difficult to use. What is needed is to allow the user to keep the hands on the keyboard while pointing, and simultaneously allow the user to input other pointing related data or "pointing events," presently input by mouse buttons, but again without moving the hands from the usual typing position.

Another problem overlooked in the prior art is that of visually locating the cursor image on a display screen. Each time a user stops typing and grasps a mouse to point, he has to search the display screen visually for the cursor, or actuate the pointing device in such a way that the moving cursor will be noticed. These methods are time consuming and may be disruptive. If the cursor image is mostly off screen, it can be extremely difficult to locate the cursor. In some cases, just one pixel is showing. With some software, moving the cursor onto certain areas of the screen indicates the desire for a particular action to be taken. If the user does not wish this action to be taken, they must perform additional steps to cancel the implied indication. What is needed is for the user to immediately detect the location of the cursor on the screen at the time pointing begins.

Known methods of repositioning a cursor in response to signals from a pointing device do not compensate for the many different modes and resolutions of available display systems. Two programs that configure the display system differently may exhibit different apparent cursor repositioning responses to the same pointing device signals. What is needed is a method of cursor repositioning that compensates for changes in the display system so that the same action performed by the user with the pointing device will produce a similar result independent of changes in the display system.

Adjusting cursor speed is another clumsy and time consuming action. Known methods of changing cursor speed introduce discontinuities that seriously disrupt the user's work flow. As a result, many people simply tolerate an inappropriate and therefore inefficient cursor speed because it is too cumbersome and too burdensome to change it.

For example, a typical mouse requires that the user first stop the application program in progress, and then execute a special mouse speed changing program, where the speed is specified by typing in a number. The resulting cursor speed cannot be observed until the application program is restarted. The user may find another adjustment is necessary and have to repeat the process.

Other known methods involve pressing keyboard keys and mouse buttons simultaneously, but these schemes are not continuous and interfere with the operation of certain application programs. What is needed is to afford a user fast, interactive ways to control cursor speed without significant interruption of work in progress.

SUMMARY OF THE INVENTION

It is an object of the present invention to allow a computer user to type and to point without removing the hands from the home row (asdf-jkl;) of the keyboard, and without dramatically changing the physical activity.

Another object of the invention is to reduce the restrictions in operation and the duplications of hardware and software found in present computer systems, while maintaining a standard software interface to existing programs for compatibility.

Another object of the invention is to allow the user to keep the hands on the keyboard while pointing, simultaneously allowing the user to conveniently input pointing related data or "pointing events," again without moving the hands from the usual typing position.

A further object of the invention is to enable a computer user to immediately detect the location of the cursor on the display screen whenever a pointing operation begins.

Yet another object is to compensate for variations in display systems when repositioning a display cursor so that a given action performed by the user with the pointing device will produce a similar result independent of variations in display systems.

According to the present invention, a single, integrated keyboard system is provided for inputting all typing and pointing information to a computer without moving the hands from the usual typing position. One of the keyboard keys, called the pointing key, has sensors coupled to it to acquire pointing direction data from lateral displacement of the pointing key.

The new system has a typing mode of operation and a pointing mode. In the typing mode, key codes corresponding to actuated keyswitches are forwarded to the operating system in the usual fashion. In the pointing mode, operation of the entire keyboard is changed. All of the keys become available for new functions.

One or more of the keys is assigned as a pointing event key, for inputting information which would come from mouse buttons in a segregated system. Other keys may be assigned various meanings for modifying operation of the system, such a cursor speed control, macros, etc.

Cursor movement is implemented in the pointing mode by reading sensor data from the pointing key, mapping the data to form cursor displacement data, and scaling the displacement data according to a speed index. Keys may be assigned for changing the speed index, and therefore the apparent cursor speed, at any time. This allows speed control interactively and without leaving an application program.

The cursor mapping may be done by algebraic manipulation of the sensor data according to a predetermined tracking algorithm, or by lookup tables. The new system also allows detecting the display mode, for example character or graphics mode, and altering cursor speed accordingly to optimize control.

The foregoing and other objects, features and advantages of the invention will become more readily apparent from the following detailed description of a preferred embodiment which proceeds with reference to the drawings.

DETAILED DESCRIPTION OF A PREFERRED EMBODIMENT

Figure 1:
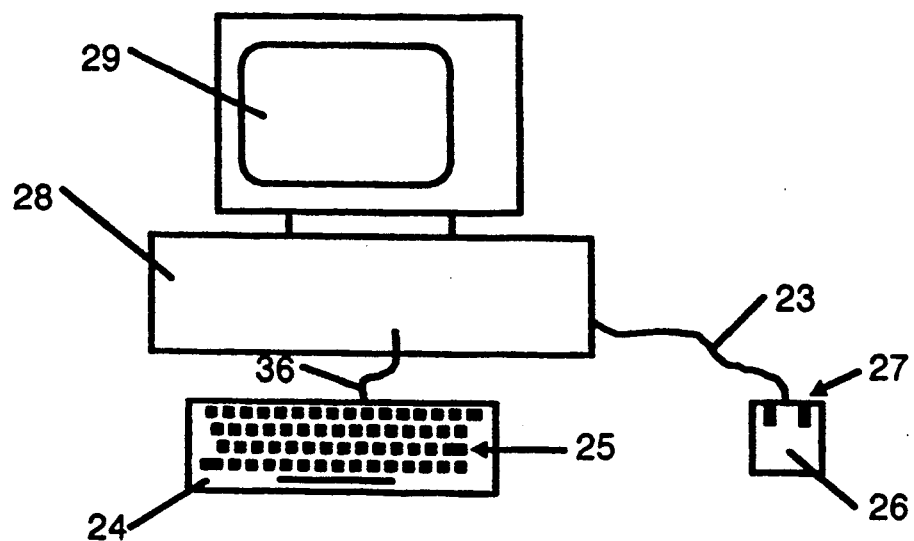
FIG. 1 is an illustration of a prior art computer system that includes a keyboard and a mouse pointing device.

The present invention is best understood with reference first to the prior art. FIG. 1 illustrates a prior art computer system. The prior art system includes a computer 28, a keyboard 24 for inputting character data to the computer, a pointing device 26 for inputting graphic data to the computer, and a display terminal 29 for display of data output by the computer. The "arrow" 25 points to the row of keys containing the home row keys of the keyboard 24. The keyboard is coupled to the computer by a communications link 36. The pointing device is coupled to the computer by a pointing device communications link 23. The pointing device 26 may be, for example, a mouse that includes one or more mouse buttons 27. The pointing device generally is used to position and to move the cursor, as more fully explained below.

Figure 2:
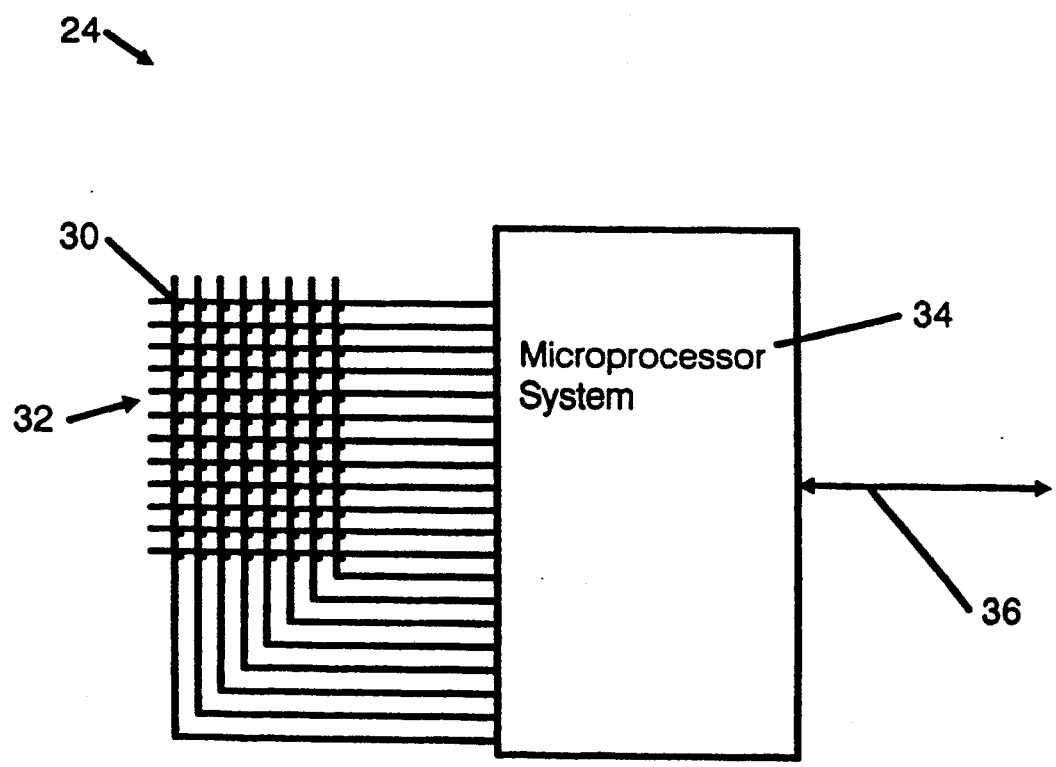
FIG. 2 is a high level block diagram of a prior art computer keyboard.

FIG. 2 is a block diagram of the keyboard 24 employed in the system of FIG. 1. The keyboard 24 includes an array 32 of keyswitches, of which keyswitch 30 is an example. The keyswitches in array 32 are arranged in rows and columns to facilitate scanning the keyboard. A microprocessor system 34 includes hardware for electrically interfacing the keyswitch array 32 to a microprocessor within the system 34.

In operation, microprocessor system 34 scans the rows and columns of array 32 to detect closures and openings of keyswitches. Upon detection of a closure or an opening of a keyswitch, the microprocessor system 34 transmits a code unique to the closed or opened keyswitch via a keyboard communications link 36 to the computer (28 in FIG. 1).

Figure 3:
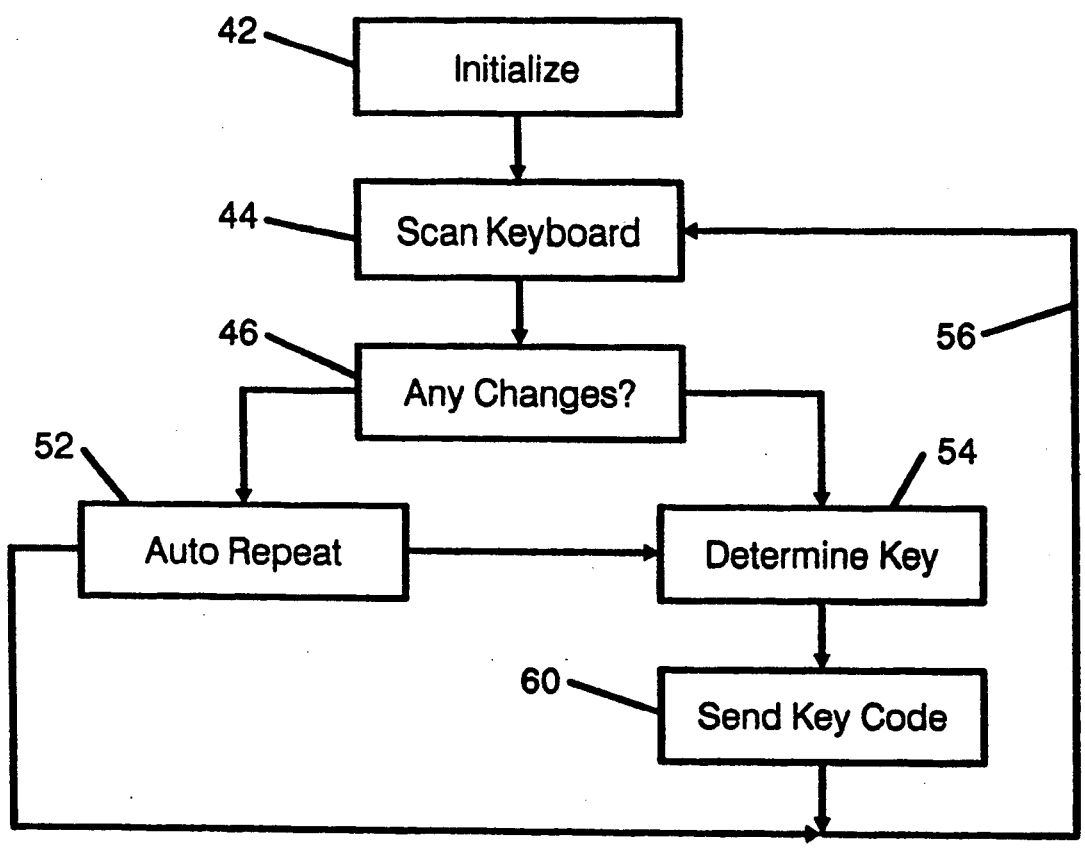
FIG. 3 is a prior art computer keyboard processing flow chart.

Referring now to FIG. 3, a high level processing control flow diagram for the keyboard of FIG. 2 is depicted to more specifically illustrate the creation and transmission of keyboard data to the computer. In FIG. 3, an initialize step 42 tests microprocessor system (34 in FIG. 2) and initializes the keyboard software state.

After initialization, a keyboard scan loop 56 begins by scanning the keyboard 44. Scan Keyboard 44 sequentially scans the rows and columns of the keyswitch array to detect changes in the state of the keyswitches. After Scan Keyboard 44 is completed, the results are checked in block 46. Control passes to an Auto Repeat block 52 if there have been no changes in the keyswitches. If there has been a change, a control passes to Determine Key block 54 to identify the affected keyswitch.

Determine Key block 54 analyzes the changes to determine what binary key codes, if any, should be transmitted to the computer. Send Key Code, block 60, transfers the key codes. In the typical case of a single keyswitch press and release, one unique key code corresponding to the keyswitch will be sent when the key is pressed and another code when the keyswitch is released.

The software represented by Auto Repeat 52 determines if it is time to automatically repeat sending the key code if the keyswitch remains pressed. After the key codes, if any, have been sent, control returns via loop 56 to begin the next keyboard scan.

Figure 4:
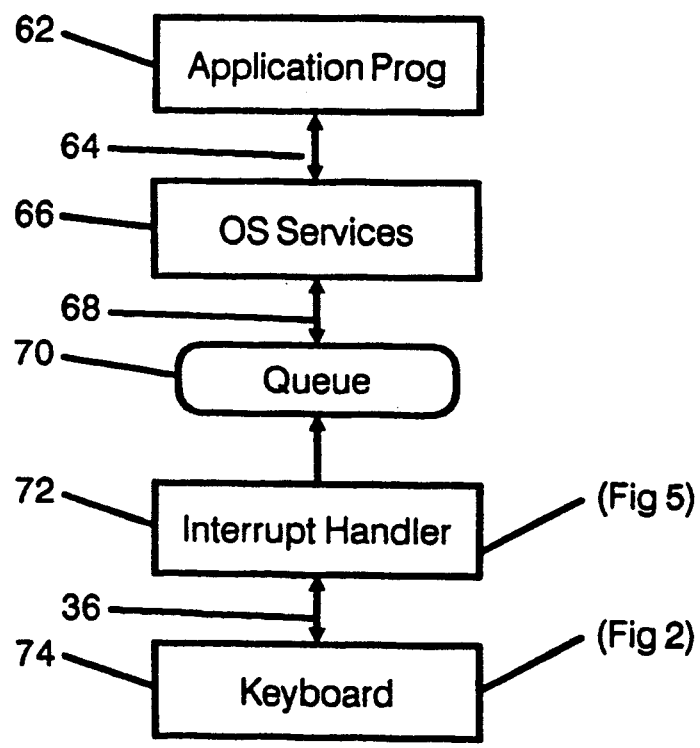
FIG. 4 is a prior art high level system block diagram of the software elements involved in processing keyboard data.

Referring to FIG. 4, a block diagram of typical prior art keyboard software interface is depicted. In this system, a computer keyboard 74 generates binary key codes when the operator presses keyswitches as described above. Binary key codes are transmitted to the computer via a keyboard communications link 36. A keyboard interrupt handler 72 reads the key codes, processes them, and places corresponding character codes into a keyboard queue 70. Generally, the keyboard interrupt handler 72 is simple, fast interrupt level software.

An application program 62 is coupled to operating system keyboard services 66 via an interface 64. In response to requests by the application program, the operating system removes character codes from the keyboard queue 70, via another interface, operating system keyboard queue interface 68, and sends the character codes to the application program 62. Operating system keyboard services 66 may examine the character codes to check for operating system requests such as application program termination. Interfaces 64 and 68 are usually bi-directional to enable the application program 62 to "put back" character codes as needed.

Figure 5:
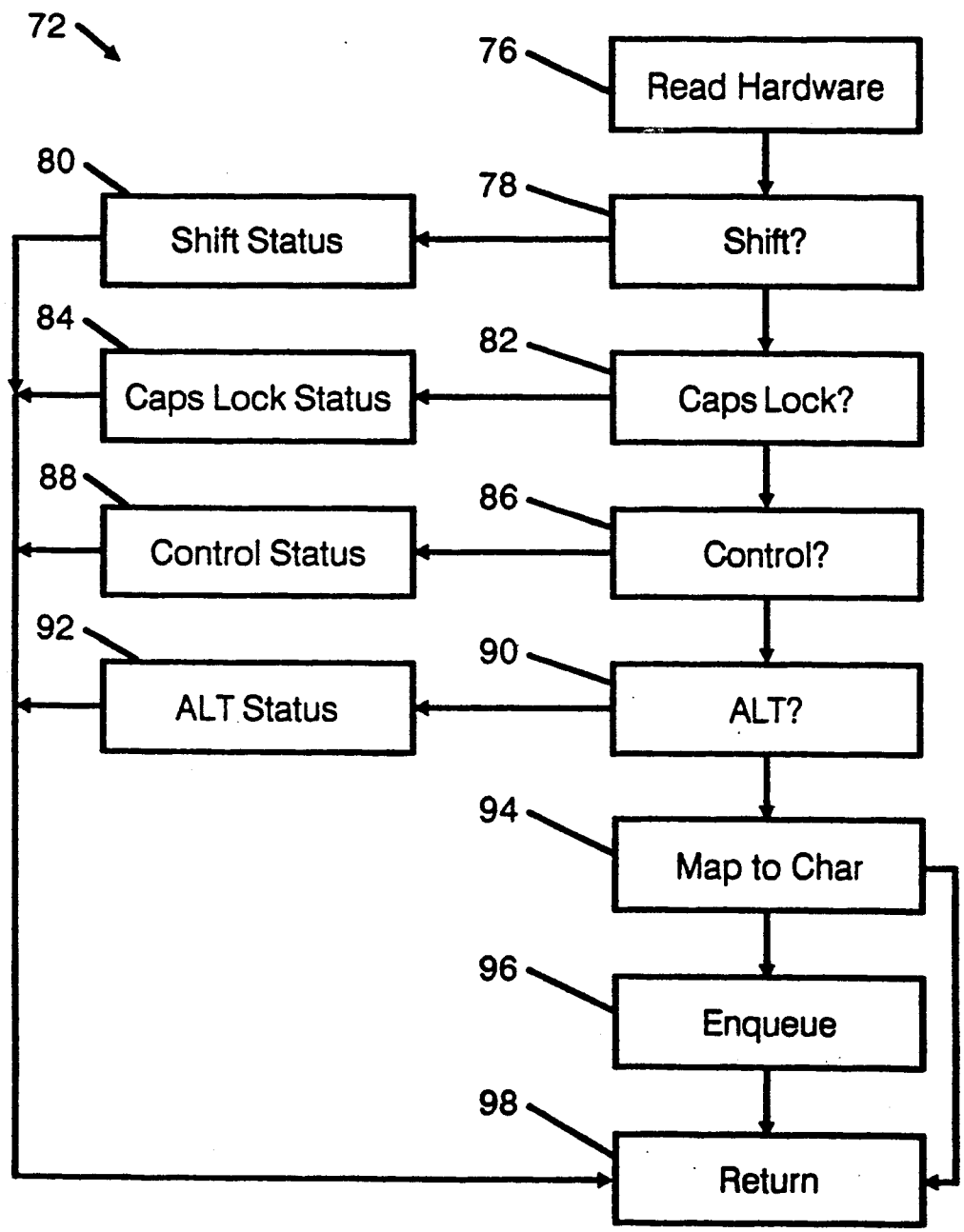
FIG. 5 is a control flow diagram for a prior art computer keyboard interrupt handler system.

Operation of the keyboard interrupt handler 72 is illustrated in greater detail in FIG. 5. Referring to FIG. 5, a Read Hardware block 76 reads the key codes from the keyboard interface hardware. Each such key code is checked to see if it represents any of the Shift, Caps Lock, Control and ALT keyswitches. These special cases are tested in blocks 78, 82, 86 and 90, respectively. For each test, if the test is negative, control is passed to the next test in the sequence shown. If all of the special case tests are negative, control passes to Map to Char block 94 for mapping the keycode. If any of the tests are positive, control is passed to update a corresponding one of status blocks 80, 84, 88 and 92, indicating whether the special key was pressed or released.

Map to Char block 94 uses a look-up table or tables to map the key code to a character code. The mapping includes the current states of the shift, caps lock, control, and ALT keys. This operation is a simple pass-through mapping. The resulting character code, if any, is passed on to Enqueue block 96. Generally, if the key code represents a keyswitch release, it is not passed on to Enqueue software 96. Enqueue 96 inserts the resulting character code into a keyboard queue (70 in FIG. 4). After a status update, or Enqueue operation, as the case may be, control returns to the interrupted program in the usual way, Return block 98.

Figure 6:
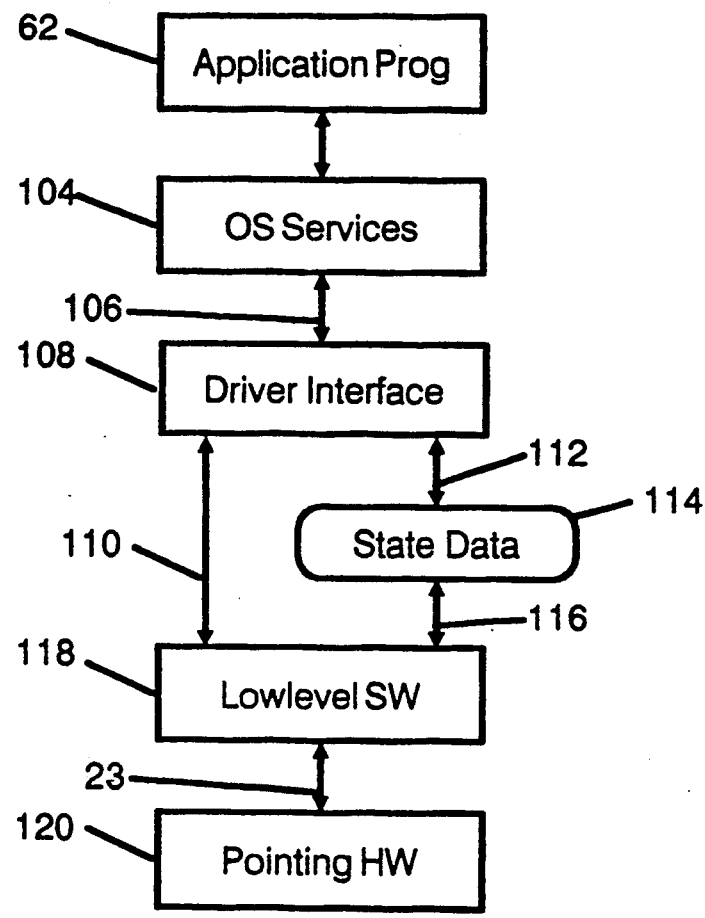
FIG. 6 is a high level system block diagram of prior art software elements involved in processing pointing device data.

FIG. 6 is a block diagram illustrating the operation of typical prior art pointing device software. Here, an application program 62 communicates with operating system (OS) pointing device services software 104. The application program passes pointing device control information, such as initial position, cursor shape, cursor visibility, etc., and receives pointing device state information such as position and button presses.

The OS services 104 in turn communicates with pointing device driver interface software 108 in accordance with interface specifications 106. Driver interface software 108 converts and formats the particular pointing device's data to conform to the interface 106. Pointing device state data, including information such as cursor shape, visibility, location and pointing device button status, are maintained in a set of memory locations called state data 114.

The pointing device driver interface software 108 communicates with state data 114 via an interface 112 and with low level pointing device software 118 via an interface 110. The low level software 118 also communicates with state data 114 through an interface 116.

In operation, the low level pointing device software 118 reads data from pointing device hardware 120 via the pointing device communications link 23. Software 118 modifies state data 114 and notifies the driver interface 108 as needed. The low level software 118 may also include software to move the cursor on the display terminal (29 in FIG. 1)

Figure 7:
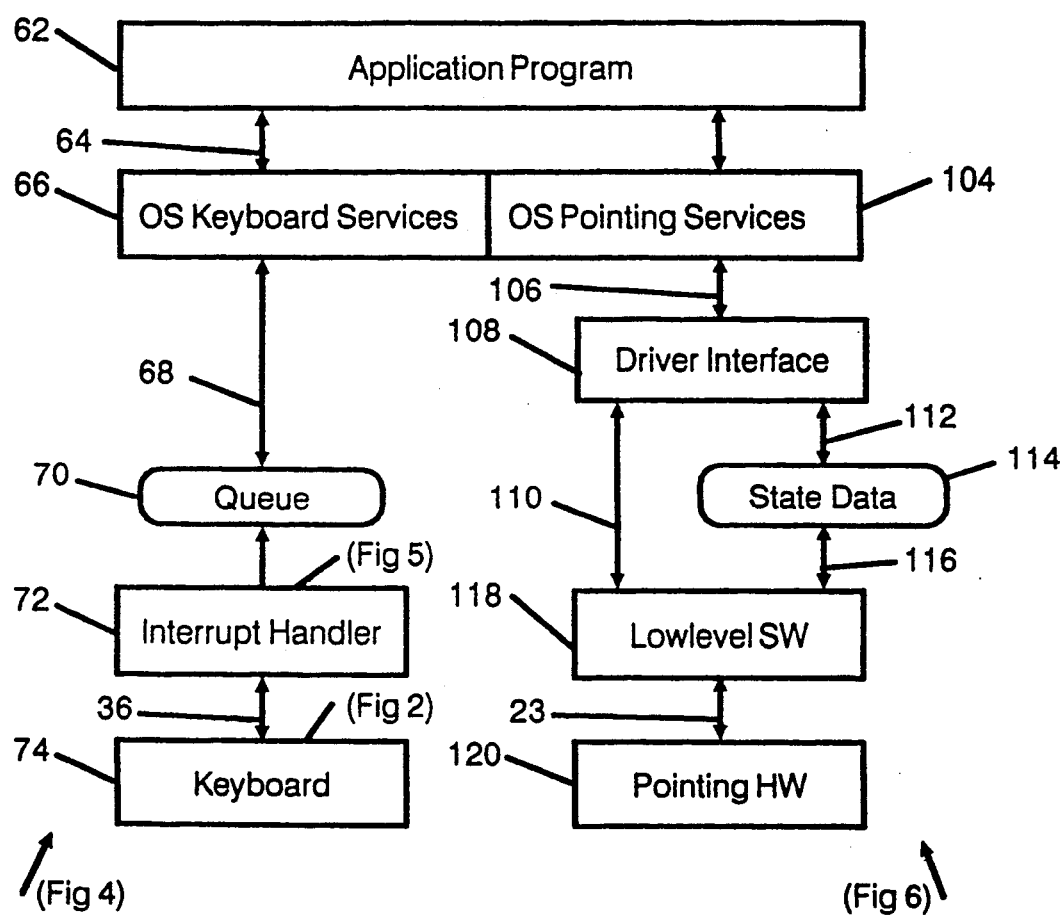
FIG. 7 is a system block diagram of a prior art computer system of the type illustrated in FIG. 1.

FIG. 7 is a software block diagram of a complete computer, keyboard and pointing device system such as that illustrated in FIG. 1. It essentially consists of a combination of keyboard software (see FIG. 4) and pointing device software (see FIG. 6). Accordingly, the details of operation need not be repeated here.

It is noteworthy that, from the lowest to highest levels, the data and control paths between the application program 62 and the keyboard 74 are separate and distinct from the data and control paths between the application program and the pointing device 120. This separation of the keyboard and pointing device interfaces reflects the segregation of keyboard and pointing device operations in the user's mind. Useful improvements in the state of this art require careful consideration of a computer user's thoughts and actions, described next.

Figure 8:
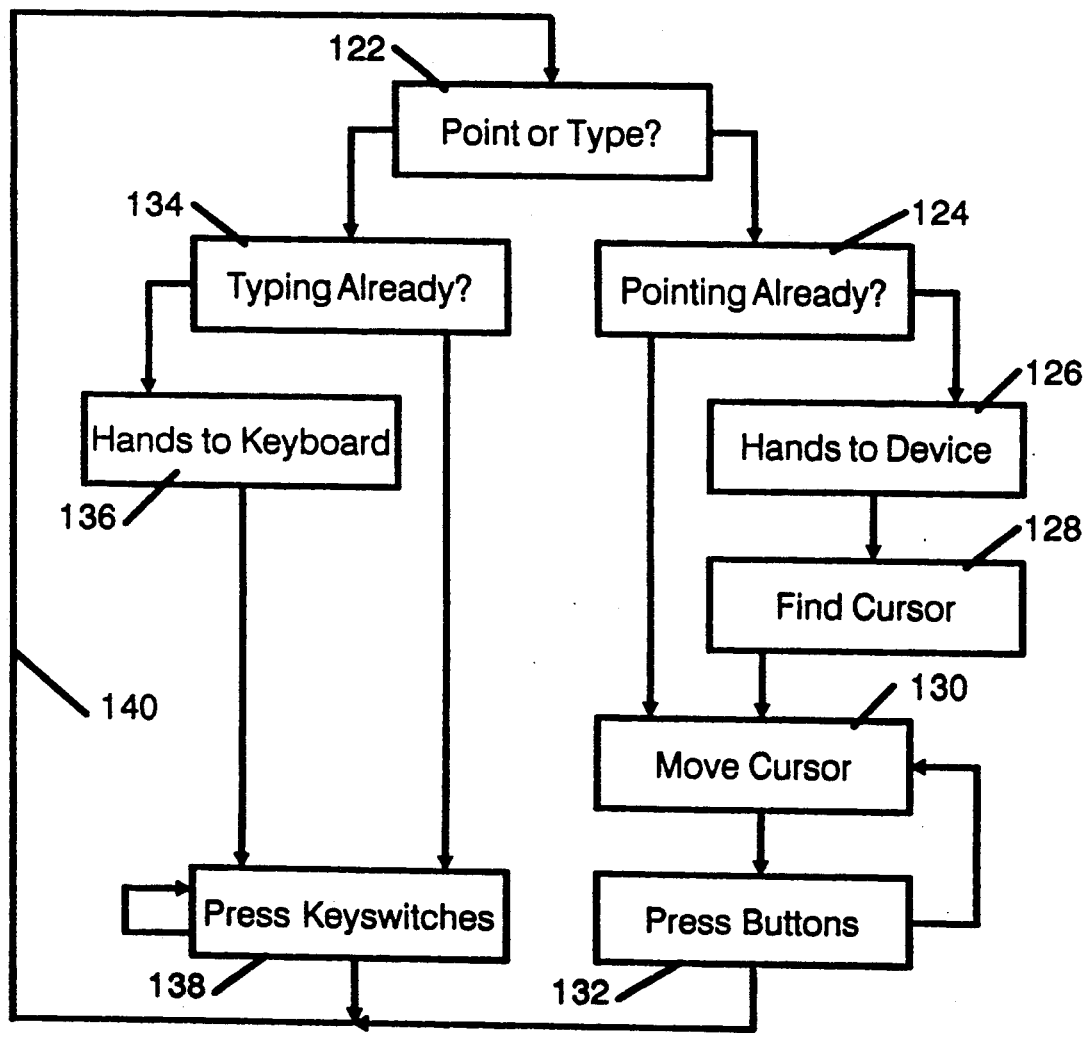
FIG. 8 is user flow chart illustrating the control flow of a computer user's decisions and actions while using a prior art computer system of the type illustrated in FIG. 1.

FIG. 8 is a "user flow chart" for using a typical computer system of the type illustrated in FIGS. 1-7. The figure diagrams the control flow of a computer user's decisions and actions while using such a system. Referring to FIG. 8, a primary loop 140 begins with a decision whether to point or type, represented by block 122. If the decision (mentally) is to type, a test 134 is performed to see if the user is typing already. Test 134 must be performed to make sure the hands and the rest of the user's body are positioned for typing. If not, the user moves their hands to a typing position, (block 136) generally on the home row of the keyboard, to begin typing. Once the hands and body are properly positioned, the user presses keyboard keyswitches to enter alpha-numeric character 138, usually repeatedly.

If the decision is made to point, the user tests (mentally) to see if he or she is pointing already, 124. This must be done to make sure the hands and the rest of the user's body are positioned for operating the pointing device. If pointing already, the user has merely to continue. If not, the user must move their hands to the pointing device 126, and then find the cursor on the display screen, 128.

The step of moving a hand to the pointing device includes whatever is required to begin operating the pointing device if the user's hands have been typing on the keyboard. Generally, this includes moving a hand off of the home row of the keyboard to where the pointing device is located, grasping the pointing device, positioning the fingers to operate the pointing device event buttons, and repositioning the arm into a comfortable position.

Finding the cursor on the display screen 128 may be as simple as remembering where the cursor was last seen, or coincidentally having it in the field of view. Quite often, it involves operating the pointing device and looking for a moving object on the display screen, thereby wasting time and effort.

Once a hand is on the pointing device and the cursor has been located, the pointing device may be operated to perform two types of operations—"pointing" and "pointing events". Pointing refers to moving the mouse 130 to reposition a cursor. Pointing events are indicated by pressing pointing device buttons 132, which may include pressing, holding, or releasing selected pointing device buttons. Pointing events are used to select text, pick a menu item, and many other functions. Typical pointing device operations may involve repeated pointing and pointing events. When there is a break in activities, or when a change in activities is required, the user effectively returns to the point or type decision 122 via the primary loop 140.

Overview of Integrated Keyboard and Pointing Device System

Figure 9:
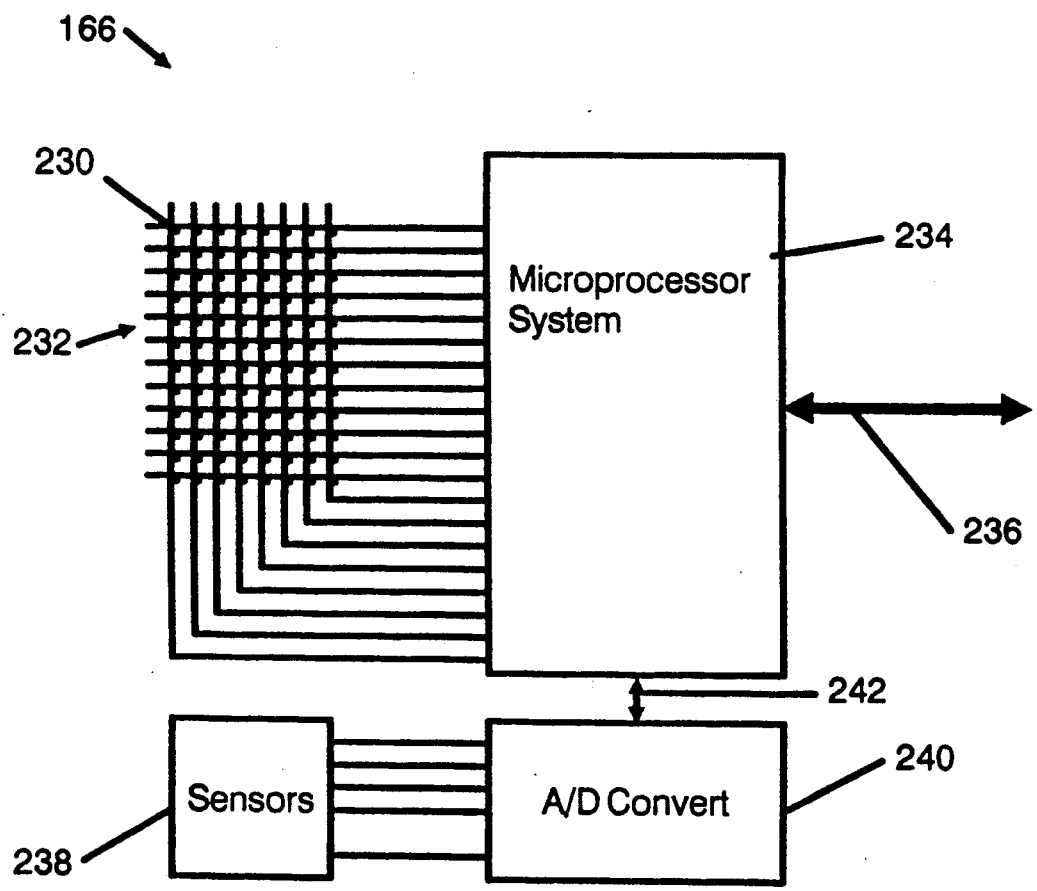
FIG. 9 is a high level block diagram of the hardware elements of an integrated keyboard and pointing device system according to the present invention.

FIG. 9 is a simplified block diagram of an integrated keyboard and pointing device ("integrated keyboard") according to the present invention. The new integrated keyboard includes an array 232 of keyswitches, of which keyswitch 230 is an example. Direction sensors 238 are embedded in the array 232 to detect pointing information. Preferably, the direction sensors are force sensors coupled to one of the keyswitches in the array to form a multi-purpose keyswitch called the pointing key. For example, where the direction sensors are coupled to the J key, the user can input pointing information by pressing on the J key in the desired direction. An example of such a multi-purpose keyswitch is disclosed in U.S. Pat. No. 4,680,577, assigned to Home Row, Inc., incorporated herein by this reference. The J key is preferred as the pointing key because it is located beneath the user's right index finger when the user's hands are positioned on the home row of the keyboard. How the integrated system distinguishes between a user inputting direction information versus merely entering the letter J is described below.

A smaller and less expensive embodiment would include four force-sensitive resistors (FSRs) coupled to the J key, one FSR for sensing force in each of the four directions in a plane. Analog to Digital conversion circuitry 240 includes electronic circuitry for transforming the FSR resistances, analog information, to representative digital signals. Analog to digital conversion is known and therefore will not be described in detail.

Analog to Digital circuitry 240 is coupled to the microprocessor system 234 via a path 242. Microprocessor system 234 includes hardware for electrically interfacing the array 232 and A/D circuitry 240 to a microprocessor (not shown) within the system 234.

The integrated keyboard and pointing device has at least two distinct modes of operation; a typing mode for entering alpha-numeric character data, and a pointing mode for entering pointing information, such as would be input in the prior art by a separate pointing device such as a mouse. Pointing information includes pointing direction information and pointing event information.

In general, the microprocessor system 234 scans the keyswitch array 232 to detect closures and openings of keyswitches. Upon detection of a closure or an opening of a keyswitch, system 234 transmits a code unique to the actuated keyswitch over a keyboard communications link 236. System 234 also determines whether the sensors 238 must be scanned by examining the sequence of keyswitch closures and openings, or by receiving a message from the computer system. If so, a sensor scan is performed to acquire pointing direction information from the sensors 238, and the pointing direction information also is transmitted over link 236. A separate physical connection to the computer for sending pointing direction information is not required.

Figure 10:
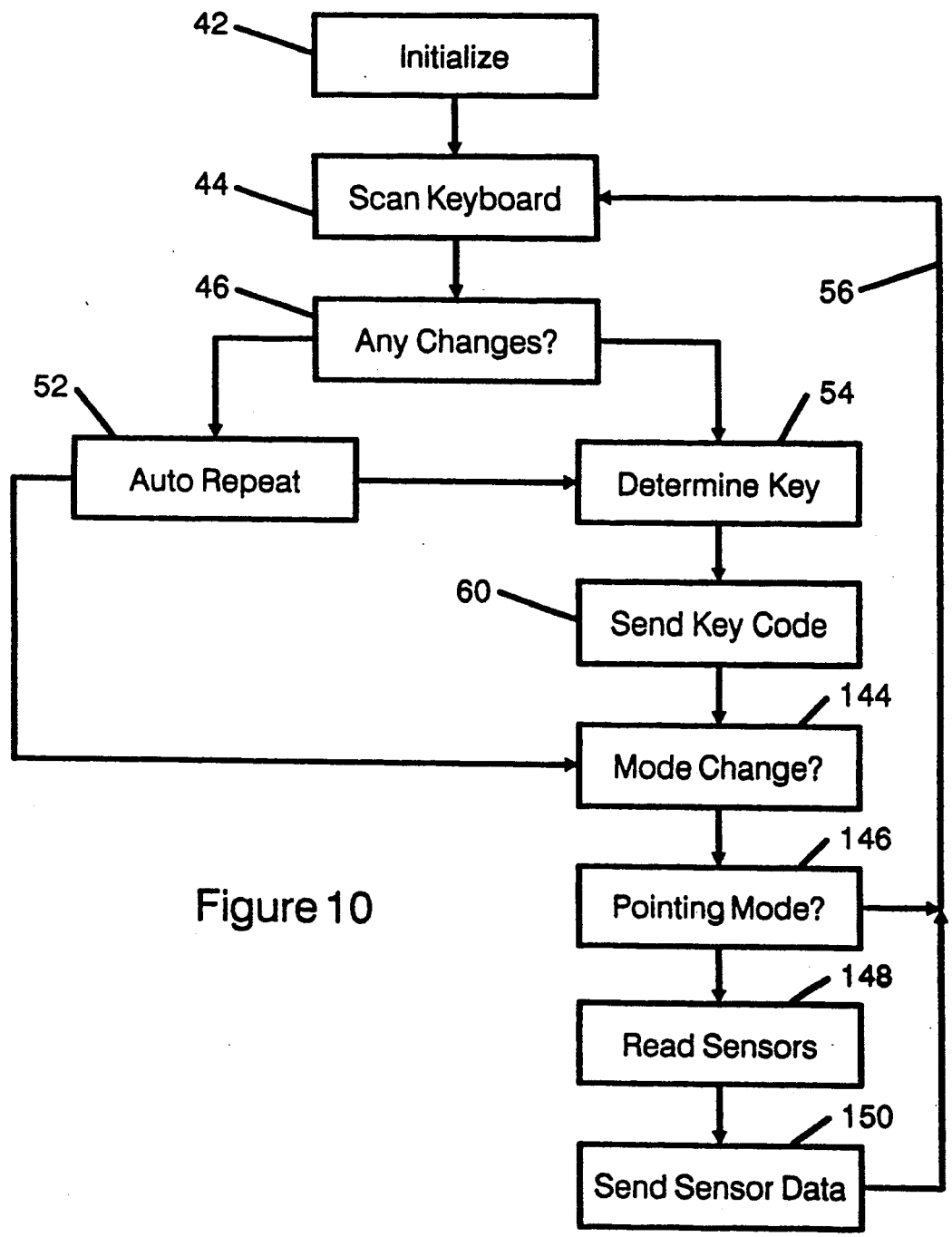
FIG. 10 is a flow chart showing the high level processing control flow for the integrated computer keyboard and pointing device system of FIG. 9.

FIG. 10 is a flow chart of operation of the integrated keyboard and pointing device of FIG. 9. Referring to FIG. 10, an initialization step 42 tests the microprocessor system 234 (FIG. 9) and initializes the keyboard software state. Next, keyboard scan loop 56 begins with scanning the keyboard to determine the current states of the keyswitches.

After scanning 44 is completed, the results are checked in step 46 to determine if any keyswitch state changes have occurred. If there have been no changes, control passes to an auto repeat step 52. Auto repeat step 52 functions as described above with regard to FIG. 3. If there have been changes, control passes to determine which keyswitch state changed, step 54. Step 46 does not indicate a changed condition until multiple keyboard scanning passes have been made for software keyswitch debounce.

Determine Key step 54 analyzes the changes to determine what binary key codes, if any, should be transmitted to the computer, step 60. In the typical case of a keyswitch press and release, one unique key code corresponding to the keyswitch will be sent when the keyswitch is pressed and another when the keyswitch is released.

After the keyswitch changes, if any, have been processed, a decision 144 determines if the keyboard operating mode must be changed between typing and pointing modes. This check for mode change may consist of examining keyswitch presses and releases, checking for commands from the computer via the communications link or checking for activation by the user of other sensors on the keyboard, such as thumbswitches (described below).

Figure 16:
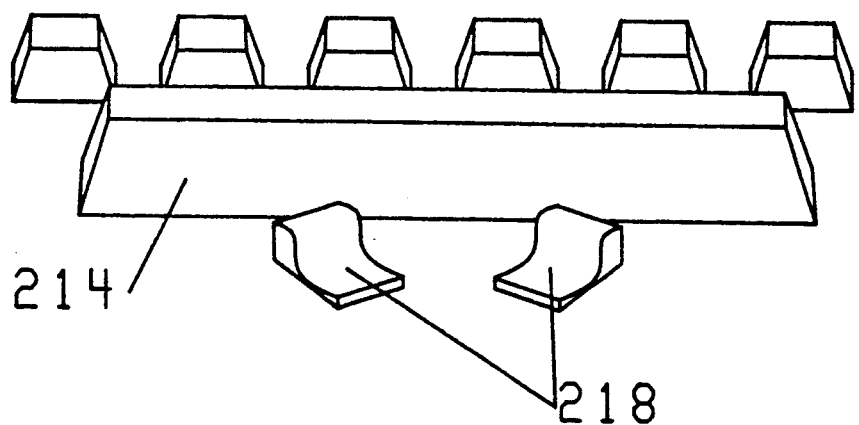
FIG. 16 is an enlarged, perspective view of a pair of thumbswitches positioned in front of the space bar on a keyboard.

FIG. 16 illustrates a pair of thumbswitches 218 positioned below the space bar 214 of a keyboard 212 for indicating an operating mode change. The thumbswitches 218 are operated by sliding them in the plane of the keyboard generally towards the space bar. The thumbswitches are conveniently placed and operated at such an angle as to allow the natural movement of the thumbs towards the other fingers to provide the actuating effect.

The mode of the integrated keyboard and pointing device may be changed from typing to pointing by operating a thumbswitch. The effects on the pointing mode are determined by the next keyboard key pressed. For example, pointing mode may be entered by operating a thumbswitch, and when the J key is pressed to operate the pointing device, the thumbswitch may be released. When the J key is released, the keyboard returns to typing mode. Thus, the thumbswitch only indicates a possible entry into pointing mode, and not necessarily the exit from pointing mode. The thumbswitches 218 allow fast, natural operation without moving the hands away from the home row of the keyboard.

An appropriate mode change is made if indicated. Next, a test for pointing mode 146 is performed to determine if pointing device processing must be done. If the current mode is typing, control returns via loop 56 to again scan the keyboard 44.

If the current mode is pointing, the system next reads the direction sensors to acquire pointing direction data, and processes that data, step 148. Sensor data processing may include amplification, filtering, and nonlinear transformations. The sensor data processing that occurs at this point is simple and fixed in nature. Additional processing in the computer system remains to be done. When the sensor data processing is completed, the processed sensor data is sent to the computer 150. In an alternative embodiment, raw sensor data could be sent to the computer for processing, either in real-time or in packets. After the processed sensor data is sent, control passes over loop 56 to again scan the keyboard, and the foregoing process is repeated.

Figure 11:
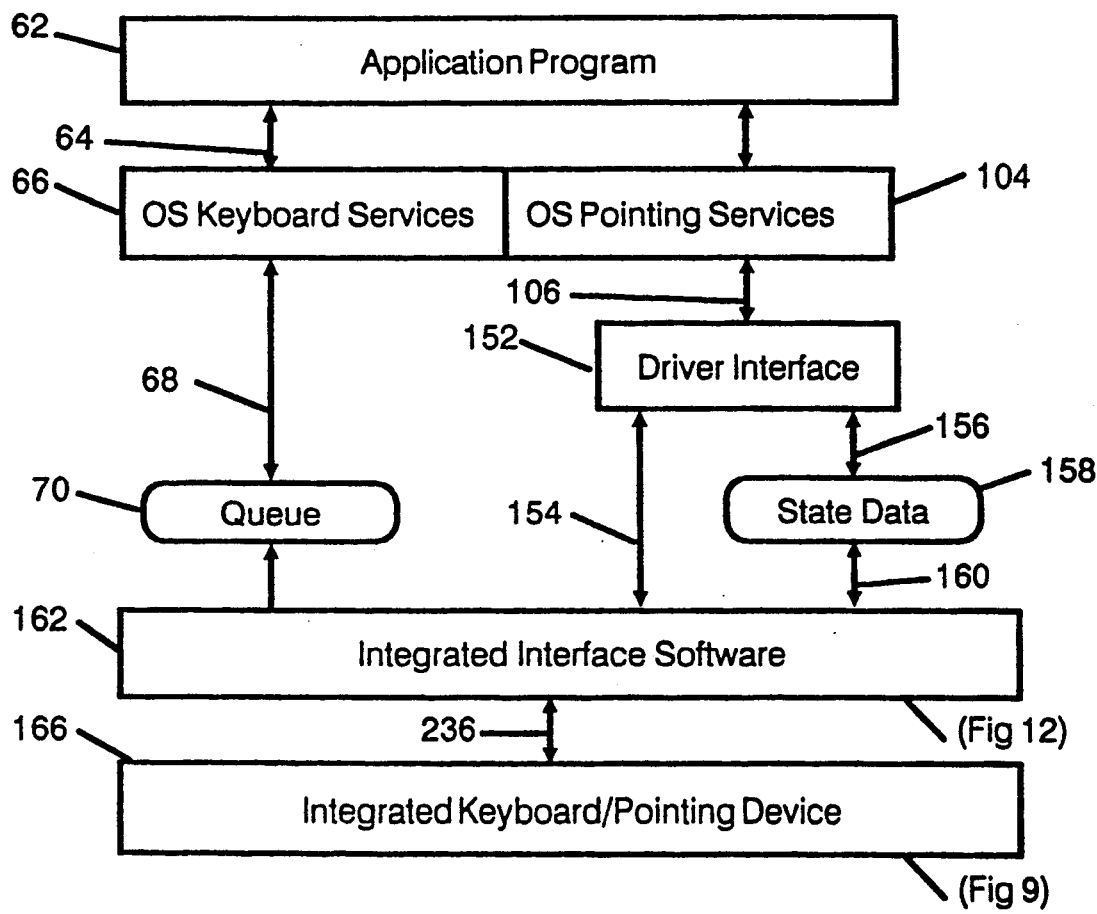
FIG. 11 is a system block diagram of a computer system that includes an integrated keyboard and pointing device of the type illustrated in FIG. 9.

FIG. 11 is a block diagram of a computer system that includes the integrated keyboard of FIGS. 9-10. At the application program (62) and operating system (66, 104) levels, this figure is similar to FIG. 7. At the lowest interface level however, all user input is via common "integrated interface software" 162. This novel structure enables additional control to be performed and new features implemented, as further described below. By intercepting keyboard and pointing device data at the lowest levels, new operations may be provided which are entirely transparent to the application program. Thus, the application program "thinks" the system includes a mouse.

The computer system of FIG. 11 operates as follows. The integrated keyboard 166 sends binary encoded key code and pointing device sensor data over a communications link 236 to integrated interface software 162 includes. The integrated interface software 162 a special interrupt handler for separating the data stream from the integrated keyboard into keyboard and pointing device data streams. Integrated interface software 162 includes key code-to-character code mapping software, and additional pointing device data processing software, including software to move the cursor on the display screen.

A key code processing portion of the integrated interface software 162 operates in a manner similar to keyboard interrupt handler 72, with additional software to detect and honor keyboard/pointing device mode change requests. Software 162 inserts character codes into the keyboard queue 70. Operating system keyboard services 66 reads the queue 70 via operating system keyboard queue operations 68 upon request by the application program 62. The applications program is linked to the OS keyboard services via an interface 64.

A set of memory locations called integrated state data 158 includes everything contained in the pointing device state data 114 (FIG. 6), as well as additional state data to keep track of operating modes (for example typing and pointing) and new features (for example variable cursor tracking controls, described below). Interface 156 and particularly interface 160 likewise have additional controls and features as compared to the corresponding interfaces 112 and 116 found in a typical pointing device (FIG. 6), as required in view of the new integrated interface software described below.

Driver interface block 152 provides a standard pointing device interface as required by OS (Operating System) pointing services 104 and the application program 62. Both the interface between the application program and the operating system pointing services 104, and the interface 106 between the operating system and the driver interface 152 are similar to a typical pointing device system so that operation of the integrated system is transparent to the OS and to the application program.

Integrated interface software 162 communicates with driver interface 152 as shown by path 154.

Integrated Keyboard/Pointing Device Interface Software

FIG. 2 is a control flow diagram for the integrated interface software 162. It includes all the processing performed by a typical keyboard interrupt handler (see FIG. 5), indicated by dashed line 99. Additionally, integrated interface software 162 includes software to detect and honor keyboard/pointing device mode change requests, convert pointing device sensor data into changes in cursor position, emulate pointing device buttons using keyboard keyswitches, modify pointing device operations using keyboard keyswitches as controls, and provide integrated typing and pointing macro capabilities from a pointing device using keyboard keyswitches (188). Each of these features is described in turn below, in the order of control flow shown in FIG. 12.

A Read Hardware block 76 reads binary key code/pointing device data provided over the communications link 236 (FIG. Once the data has been read, Check Mode block 167 determines the present mode (for example, typing or pointing) of the integrated keyboard/pointing device. Control transfers to Change Mode? 169 if the present mode is typing, and to Change Mode? 170 if the present mode is pointing. The typing/pointing mode encompasses all other keyboard states (shift, caps lock, control, alt), so that typing/pointing mode becomes a new mode "on top of" all these conventional keyboard modes, not merely in addition to them.

Typing Mode

Change Mode? 169 determines if the acquired key code data indicates that the user wishes to change the mode of the integrated keyboard from typing to pointing. This determination may include checking for a unique predetermined code, or a more complex test based on multiple previous codes and other keyboard modes (shift, caps lock, control, alt) as well. If the test determines that integrated keyboard is to be changed from typing to pointing mode, the requested change is performed in Change Mode 168. Change Mode 168 includes setting flags in state data 158 (FIG. 11), changing the visual appearance of the cursor and acknowledging the mode change to the user. After the mode change is completed, nothing more needs to be done until further data is received, so control is passed to return from interrupt 98.

If Change Mode? 169 determines that no change of mode is necessary, the key code is treated as it would be treated by a typical keyboard interrupt handler. Thus, tests for Shift Key 78, Caps Lock Key 82, Control Key 86, and Alt Key 90 are performed. The status of each of these special keys 80, 84, 88 and 92, respectively, are updated as required. Map Key Code to Character Code 94, Enqueue Character Code 96, and Return From Interrupt 98 all operate as in the typical keyboard interrupt handler.

Pointing Mode

If Check Mode 167 determines that the integrated keyboard device is in pointing mode, a test 170 is performed to determine if the user wishes to begin typing again. This test may include examining a single data item, or a more complicated test based on conventional keyboard modes (shift, caps lock, control, alt) and previous binary key code/pointing device data items. If Change Mode? 170 determines the mode is to be changed to typing mode, the requested change is performed by Change Mode block 172.

Change Mode 172 may include setting flags in state data 158, changing the visual appearance of the cursor and acknowledging the mode change to the user. After the requested mode change is effected, nothing more needs to be done until further data is received, so control is passed to Return 98.

If Change Mode? 170 determines that the mode is to remain pointing, the next test performed on the data is to test for cursor positioning data, labeled Pointing Data? block 174. This test determines whether the data is pointing device positioning data or key code data. This test may include checking flags and counters in state data 158 as well as testing bits within the data itself.

If Pointing Data? 174 determines that the data is cursor positioning data, Update (cursor) Position block 176 is performed to move the cursor on the computer display screen, update the cursor position in the state data 158, and notify the driver interface 152 (FIG. 11) of the changes. Update Position 176 may include cursor tracking algorithms to convert the cursor positioning data into changes in cursor position. Upon completion, control is transferred to return from interrupt 98.

Cursor movement is effected as follows. The pointing data are read (76) and the cursor repositioned periodically, for example, as driven by a keyboard clock interrupt operating at approximately 18-20 Hz. The "cursor speed" apparent to the user actually is proportional to the magnitude of changes in cursor position each time the cursor is repositioned, and the frequency of repositioning. A change in the clock speed will of course result in a proportional change in apparent cursor speed, so the keyboard clock rate of a system should be taken into account in cursor tracking.

Accordingly, to effect high apparent cursor speed, a given input force is mapped to a relatively large change in cursor position. To "slow" the cursor, changes in position are scaled down.

The update position or "tracking" software 176, in addition to responding to pointing data from the keyboard, can also consider implicit speed controls implied by the state of the pointing event keys as reflected in the state data.

The tracking software also takes into account the explicit speed modification settings, controlled by modification software 184, the display resolution, as determined by the standard means for the particular computer and display system, and the display mode (character cells or graphics pixels) as determined by the standard means for the particular computer and display system.

One operative example of implementing the cursor tracking software uses multiple predetermined look-up tables. For instance, a set of graphics mode look-up tables take into account everything except the implicit pointing event key speed controls and the explicit speed modification settings controlled by modify operation 184. Two sets of two graphics mode tables would be provided: a horizontal and a vertical table set for use when the pointing event keys are not pressed, and another horizontal and vertical set for when the pointing event keys are pressed.

The partially processed data from the communications link 236 is used as an index into the appropriate table. The result of this table look-up operation is a cursor displacement, which may be multiplied by a scaling factor determined by the explicit cursor speed controls in modify operation 184. After this multiplication, the displacement is used as a change in the horizontal or vertical component of the cursor position. The new cursor position is then calculated by adding the displacement to the present position. After both the horizontal and vertical coordinates have been recomputed, the cursor image is erased from the present position and redrawn at the new position. Analogous table sets may be provided for character cell display modes.

An advantage of using different tables depending on the state of the pointing event keys is that, with most application software, the pointing event keys in the released position indicates nothing important is happening. In this situation, the user generally desires to move the cursor as quickly as possible, to reduce the cursor repositioning time.

When a pointing event key is pressed, the user is indicating something specific and generally desires to move the cursor in a more controlled manner. Speed is important when the event buttons are not being pressed, and control is important when an event button is being pressed. In practice, it has been found that an approximately quadratic force-to-apparent cursor speed mapping table works best for fast cursor positioning, and that an approximately linear mapping table works best for more controlled cursor positioning.

Pointing Events

"Pointing events" are input by a user of pointing-related information, usually other than cursor positioning or directional information. For example, in the prior art, pointing events include pressing and releasing mouse buttons, also referred to as "clicking" the mouse buttons. Pointing events may serve to select an item associated with the current position of the cursor. Or, a pointing event may signal a request to move previously selected text to the current location of the cursor.

According to the present invention, one or more of the keyswitches in the integrated keyboard are designated for emulating pointing events. These are called pointing event keys. When the integrated keyboard is in the pointing mode, actuation of one of the pointing event keys is interpreted as a pointing event. This allows a user to input pointing events without removing their hands from the keyboard. Preferably, the D and F keys, or other keys on the home row of the keyboard, are so designated for emulating pointing events, so that all typing and pointing operations can be conducted from the normal typing position. This feature yields substantial time savings and ergonomic advantages to a user of the integrated keyboard. Pointing event emulation is implemented in the preferred embodiment as follows.

Referring again to FIG. 12, if test 174 determines that the binary key code/pointing device data is not pointing device data, the data is then known to be key code data. In that case, control passes to test 178, to test the data for pointing device button emulation.

If the data represents any of the keyboard keyswitches designated to emulate pointing device buttons, the key code data is passed on to block 180 where the key code data is converted to changes in pointing device button status and stored in state data 158 (FIG. 11). This information may be used in various ways. For example, it may be helpful in some applications to temporarily freeze cursor motion for a predetermined period of time in response to a pointing event, to minimize the effects of inadvertent cursor movement during the pointing event.

Software 180 thus emulates the use of pointing device event buttons such as mouse buttons. Because nearly any or all of the keyswitches in the array may be designated to emulate pointing device buttons, the number of keyswitches so designated is limited only by the number of keyswitches on the keyboard. This feature provides for more flexibility in pointing operations as compared to a two or three button stand alone pointing device. When the emulation actions 180 have been completed, control is passed to block 184, where implicit changes to the operation of the pointing device are performed, such as changing the cursor tracking algorithm depending on the state of the emulated pointing device buttons.

Interactive User Modification of the Integrated Keyboard System

Explicit modification of the integrated system, i.e. changes in operation requested by a user, are described next. If test 178 determines that the key code information does not represent any of the pointing event keyswitches, control is passed to a test 182 to determine whether the key code represents a keyswitch assigned to modify operation of the pointing device or other aspects of the integrated keyboard system. Such keyswitches are called modify operation keyswitches, and can perform various tasks further described below. If the key code represent a modify operation keyswitch, control is passed to modification software 184. Modification software 184 uses the key code information to modify operation of the system as requested.

In a system of the type described, such modifications may include a wide variety of changes to the behavior of the system. The effects of some of these changes are known in the prior art, but known ways to accomplish them are quite different and far less efficient. Other modifications are applicable only to the new, integrated keyboard system.

To illustrate, it is known to change the apparent cursor speed in a mouse system by first exiting the application program, running a special program to alter cursor speed, and then re-entering the desired application program. In the integrated system, a single stroke of the keyswitch assigned the cursor speed-up (or down) function accomplishes the same result. Obviously, the change is made more quickly and without significant interruption of the user's work. Importantly, the speed control is interactive in that the user immediately sees the result of the speed adjustment. Further adjustment may be made immediately, if deemed necessary.

Another illustrative modification is changing the condition to exit from pointing mode. In other words, entering a pointing-lock mode, in which the user has to do more than release the pointing key to resume typing mode. For instance, pressing the space bar while in pointing mode may be arranged to enter a pointing-lock mode, so the system does not exit pointing mode, even if the J key is released. The system may return to typing mode only when the space bar is pressed.

Yet another use of modify operation keys is to lock/unlock or change axes of the pointing device. In the past, these changes have been made by special additional mouse buttons, or by running special software at the application level. Making these selections with modification keys is much faster and less disruptive.

Another example of a system modifications which may be implemented with modify operation keys is changing the cursor tracking algorithm. For example, various predefined tracking algorithms may be provided, each of which is optimized for a particular application, e.g. word processing, CAD, etc. A single keystroke selects the best tracking algorithm for cursor control. After the indicated modify operation is completed, control is passed to Return 98.

Yet another modification is to toggle the integrated keyboard between right and left handed operation. For example, in right-handed mode on a QWERTY keyboard, the J key is the pointing device and the D and F keys are conveniently used as pointing event keys. Upon switching to left-handed mode, the F key is the pointing device and J and K keys are pointing event keys. This feature requires two multipurpose keyswitches (disposed at F and J), but otherwise is easily implemented in the software by simply changing the interpretation of the affected keys for pointing mode. Thus, the test for modify operation keys would lock for J and K to detect pointing events while in left-handed mode, but look for D and F for the same purpose while in right-handed mode. These examples merely begin to illustrate the functions available with an integrated keyboard system. Virtually all of them may be implemented at the lower software levels, namely the interrupt and driver levels, so they are transparent to the application software and the operating system.

Another illustrative use of modify operation keys is for macros. Macros, used as abbreviations for segments of test and/or strings of program commands, are known. In the integrated system, macros can include a mix of cursor motions, pointing events and keyboard strokes. For example, a macro can be set up to move the cursor, pull down a menu and pick an item. This feature can easily be programmed in the integrated system environment described herein.

If the test for pointing device modification (182) determines the key code does not represent any other modification request, control is passed to a test for macro expansion 188. Macro Expand 188 determines if the key code is one that is currently a macro command in need of expansion. If so, the macro is expanded and control is passed to Change Mode? 170 where the expanded data is operated on.

If Macro Expand 188 determines the key code is not one that is currently designated for macro expansion, control is passed to a test for typing emulation, "Alpha Emulate" block 186. Alpha Emulate 186 determines if the key code is currently being mapped back to a typing operation, and if so, control is passed to test for shift key "Shift?" 78 and key code processing continues as if the integrated device mode was typing instead of pointing. This feature thereby effectively changes the device temporarily to typing mode automatically in response to the user entering typing data. The user can resume pointing activity without explicitly changing mode. If test 186 determines the key code is not currently being mapped back to a typing operation, control is passed to Return 98 and the key code is effectively ignored.

Details of implementing the foregoing software will be apparent to those skilled in the art in view of this disclosure. The various features indicated as performed in the computer, as distinguished from the integrated keyboard, preferably are implemented in software so that they can be employed on various computer systems without modification of the computer hardware.

Operation of the Integrated System

Figure 13:
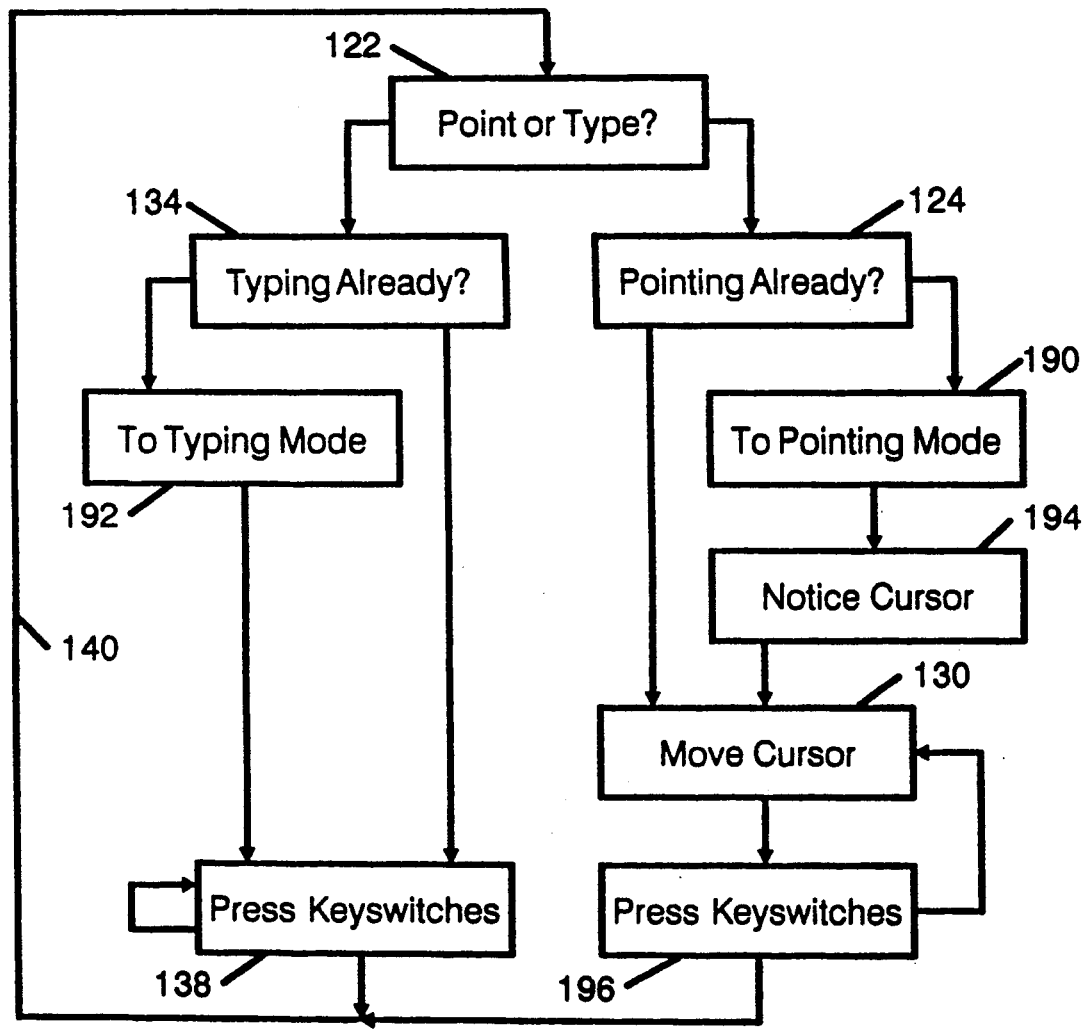
FIG. 13 is a user flow chart illustrating control flow of a computer user's decisions and actions while using a computer system of the type shown in FIGS. 9–12.

FIG. 13 depicts a user flowchart for an integrated keyboard according to the present invention. The figure illustrates the control flow of the computer user's decisions and actions while using the integrated system. Once the user has begun a task requiring both typing and pointing activities, the user must repeatedly make a mental decision to point or type 122. If the decision is to type, a test to see if the user is typing already 134 must be performed to make sure the mode of the integrated device is in typing mode. If not, a change to typing mode 192 must be performed before typing can begin. This mode change is a simple action that can be performed with the hands in the typing position on the keyboard. Once the mode is typing, the user proceeds to type 138.

If the decision 122 is made to point, a test to see if pointing already 124 must be performed to make sure the integrated device is already in pointing mode. If so, user has merely to continue. If not, the user must change the keyboard to pointing mode 190 and notice the cursor 194.

The switch to pointing mode 190 can be performed with the hands in the typing position on the keyboard. The cursor is easy to find because, in response to the mode change, the system causes the cursor image on the display screen to flash, for example by intermittently enlarging the cursor image. Noticing the change in cursor appearance is particularly easy because the peripheral vision of the human eye is extremely well adapted at noticing changes in brightness and movement. Thus, there is no need to remember where the cursor was last seen, or coincidentally have it in the field of view, or to actuate the pointing device to detect cursor motion.

Once the integrated device is set to pointing mode, the pointing device may be operated 130 and useful actions performed. Pointing events are indicated by pressing, holding, or releasing keyboard keys 196. This aspect of the integrated system allows the user to indicate pointing events while the hands remain in the typing position. Typical pointing device operations may involve repeatedly moving the cursor and pressing keyswitches.

When there is a break in activities, or when a change in activities is required, the user effectively returns to the decision to point or type 122 via loop 140.

Cursor Speed Control

A predetermined cursor speed index value is stored. Processing the point data requires converting the pointing data to form cursor displacement data and scaling the cursor displacement data in proportion to the cursor speed index value. Increasing the apparent cursor speed is effected by incrementing the cursor speed index value. Conversely, decreasing the apparent cursor speed is effected by decrementing the cursor speed index value.

Figure 14:
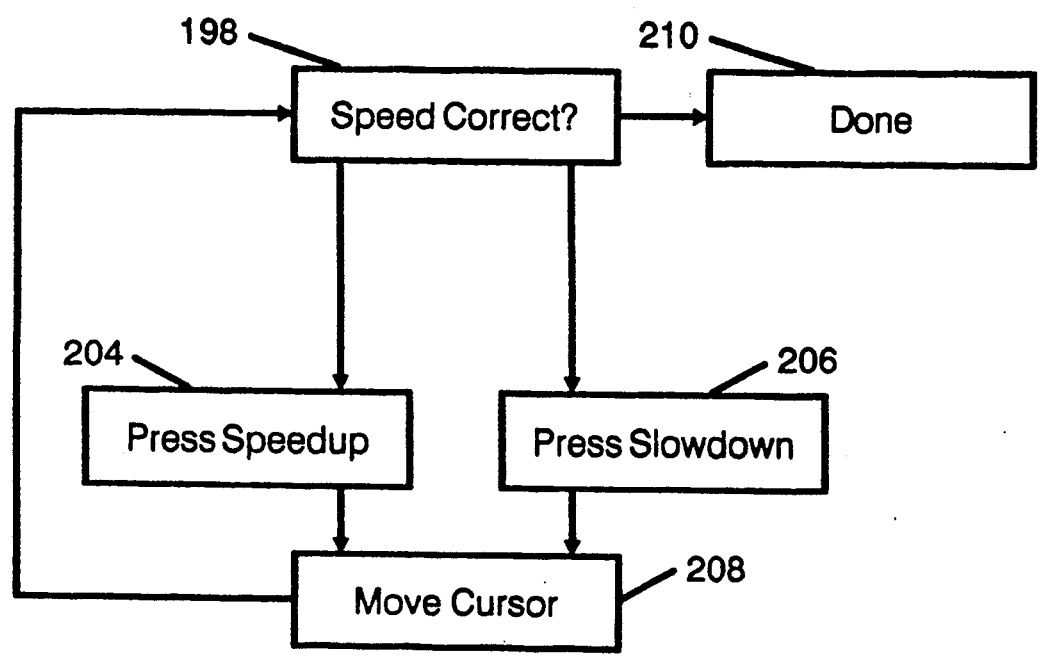
FIG. 14 is a user flow chart illustrating control flow of a computer user's decisions and actions while using an integrated pointing device speed control according to the present invention.

FIG. 14 is a user flow chart for changing the cursor speed using the integrated keyboard. It is assumed, of course, that the system is in the pointing mode. The user starts out by deciding if the cursor speed is acceptable 198 or if it should be altered. If the present speed is too slow, the user can increase it, pressing a predetermined keyboard keyswitch (for example, the R key) 204. If the cursor is deemed too fast, decelerating the cursor is likewise as simple as pressing a predetermined keyboard keyswitch (for example, the V key) 206. After the appropriate keyswitch is pressed, the user moves the cursor 208 to determine the effect of the change, and again decides if the speed is acceptable 198. If the speed is still not correct, the foregoing steps are repeated.

Once the cursor speed is correct, control transfers to Done 210 where an speed modification keyswitches that were being pressed are released. This process may be continuous: the user has only to press a rate control keyswitch, move the cursor until the speed reaches the desired rate, and release the rate control keyswitch. The user thus obtains instant feedback of cursor speed changes without leaving the application program and, indeed, without even moving a hand away from the typing position.

Mode Change Switch

Figure 15:
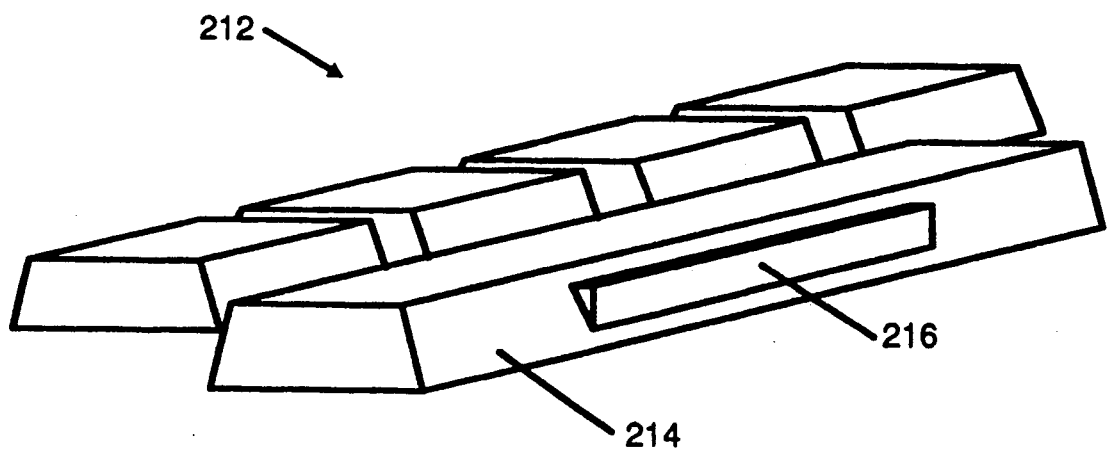
FIG. 15 is an enlarged, perspective view of a space bar on a conventional keyboard modified to include a thumb switch in the front face of the space bar.

FIG. 15 illustrates modification of the space bar on a conventional keyboard in accordance with the present invention to distinguish being pressed towards the other keys in the keyboard as well as down into the keyboard. Space bar 214 is shown in the conventional position below and in front of example keyboard keys 212. Mode change bar 216 is placed in the front face of space bar 214 for ready operation by the user's thumbs. When the hands are in the typing position, the natural grasping action of the thumbs easily brings them to push mode change bar 216 further into the front of space bar 214, activating a mode change keyswitch mounted beneath the space bar.

Having illustrated and described the principles of my invention in a preferred embodiment thereof, it should be readily apparent to those skilled in the art that the invention can be modified in arrangement and detail without departing from such principles. In particular, but without limitation, allocation of functions between hardware and software is subject to wide variation depending upon numerous design considerations for any particular application. The principles disclosed herein can be implemented in many different combinations of hardware and software, as a matter of design choices, without departing from the principles of the invention. We claim all modifications coming within the spirit and scope of the accompanying claims.

We claim:

1. A method of inputting typing information, pointing data and point event informtaion to a computer and computer display terminal having a cursor, the method comprising:
   providing a keyboard having a plurality of operating modes including a typing mode and a pointing mode and including an array of alpha-numeric keyswitches that includes a pointing key arranged to allow lateral displacement for indicating a desired cursor motion;
   assigning at least one of the alpha-numeric keyswitches as a point event keyswitch having a corresponding pointing event function;
   determining a current mode of the keyboard;
   scanning the array to detect actuation of the keyswitches;
   responsive to such detection, if the current keyboard mode is the typing mode, initiating a key code signal corresponding to the actuated keyswitch for entering alpha-numeric typing information into the computer and, if the current mode is the pointing mode and the actuated keyswitch is one of the pointing event keyswtiches, initiating a pointed even signal;
   if the current mode is pointing mode, sensing such a lateral displacement of the pointing key to form pointing data;
   processing the pointing data to determine a new cursor position;
   moving the cursor to the new position to effect the desired cursor motion;
   assigning at least one of the keyswitches as a modify operation keyswitch having a corresponding modify operation function;
   if the current mode is pointing mode, testing the key code data to effect actuation of the modify operation keyswitch; and
   if such actuation is detected, effecting the corresponding modifying operation function.

2. A method according to claim 1 wherein:
   assigning includes assigning a first modify operation keyswitch to increase cursor speed and assigning a second modify operation keyswitch to decrease cursor speed; and
   modifying operation of the pointing key includes increasing the apparent cursor speed responsive to actuation of the first modify operation keyswitch and decreasing the apparent cursor speed responsive to actuation of the second modify operation keyswitch.

3. A method according to claim 2 including storing a predetermined cursor speed index value and wherein:
   increasing the apparent cursor speed includes incrementing the cursor speed index value;
   decreasing the apparent cursor speed includes decrementing the cursor speed index value; and
   processing the pointing data includes converting the pointing data to form cursor displacement data and scaling the cursor displacement data proportional to the cursor speed index value.

4. A method of controlling a cursor in a computer system having a pointing device for acquiring pointing data and having a switch for indicating a pointing event, comprising:
   providing a first tracking algorithm for use when a pointing event is indicated;
   providing a second tracking algorithm for use when a pointing event is not indicated;
   wherein one of the first and second tracking algorithms provides an approximately linear function of the pointing data and the other one of the tracking algorithms provides an approximately quadratic function of the pointing data;
   detecting an indication of a pointing event;
   selecting the first tracking algorithm if a pointing event is indicated and the second tracking algorithm if a pointing event is not indicated; and
   converting the pointing data according to the selected tracking algorithm to form cursor displacement data.

5. A method of inputting typing information and pointing information to a computer and display terminal having a cursor, the method comprising:
   providing a keyboard including an array of keyswitches, the array including at least one pointing key arranged to allow lateral displacement for inputting pointing data, and the keyboard having a plurality of operating modes including a typing mode and a pointing mode;

assigning at least one of the keyswitches as a pointing event keyswitch having a corresponding pointing event;

assigning at least one of the keyswitches as a modify operation keyswitch having a corresponding operation modification;

acquiring data from the keyboard;

determining a current operating mode;

if the current mode is pointing, testing the keyboard data to detect an indication of a mode change to typing;

responsive to such an indication, changing mode to typing and changing the visual appearance of the cursor to acknowledge the mode change to the user;

if the current mode is pointing, testing the data to detect pointing data;

if pointing data is detected, updating the cursor position according to the pointing data;

testing the data to detect actuation of the pointing event keyswitch;

if a pointing event keyswitch is detected, initiating the corresponding pointing event signal;

testing the data to detect actuation of the modify operation keyswitch; and if actuation of the modify operation keyswitch is detected, effecting the corresponding modification of operation of the system.

6. A method of inputting typing information and pointing information to a computer and display terminal having a cursor, the method comprising:

providing a keyboard including an array of keyswitches, the array including at least one pointing key arranged to allow lateral displacement for inputting pointing data, and the keyboard having a plurality of operating modes including a typing mode, a pointing mode and a temporary pointing mode;

assigning at least one of the keyswitches as a pointing event keyswitch having a corresponding pointing event;

assigning at least one of the keyswitches as a modify operation keyswitch having a corresponding operation modification;

acquiring data from the keyboard;

determining a current operating mode;

if the current mode is pointing, testing the keyboard data to detect an indication of a mode change to typing;

responsive to such an indication, changing mode to typing;

if the current mode is pointing, testing the data to detect pointing data;

if pointing data is detected, updating the cursor position according to the pointing data;

testing the data to detect actuation of the pointing event keyswitch;

if a pointing event keyswitch is detected, initiating the corresponding pointing event signal;

testing the data to detect actuation of the modify operation keyswitch;

if actuation of the modify operation keyswitch is detected, effecting the corresponding modification of operation of the system;

testing the data to detect release of the pointing key; and responsive to release of the pointing key, changing the system to the typing mode.

7. A method according to claim 6 in which the keyboard operating modes include a locked pointing mode and a predetermined one of the keyswitches is assigned a pointing unlock function, further including the steps of:

testing the key code data to detect actuation of the pointing unlock keyswitch; and responsive to actuation of the pointing unlock keyswitch, changing the system to the typing mode.

8. A method according to claim 7 in which the pointing keyswitch is the J keyswitch and the pointing unlock keyswitch is the K keyswitch.

9. A method of controlling the operating mode in a computer system having a plurality of operating modes including a typing mode and a pointing mode and having a keyboard that includes a pointing key, the method comprising:

assigning one of the keyswitches on the keyboard as a mode change key;

detecting a current operating mode of system;

if the current operating mode is the typing mode, detecting actuation of the mode change key;

while the mode change key is actuated, testing for actuation of the pointing key;

if the pointing key is actuated while the mode change key is actuated, detecting release of the mode change key and release of the pointing key;

if the pointing key is released while the mode change key is actuated, initiating a signal representing actuation of the pointing key; and if the mode change key is released while the pointing key is actuated, changing the operating mode to the pointing mode and changing the visual appearance of the cursor to acknowledge the mode change to the user.

* * * * *

UNITED STATES PATENT AND TRADEMARK OFFICE
CERTIFICATE OF CORRECTION

PATENT NO. : 5,124,689
DATED : June 23, 1992
INVENTOR(S) : Franz et al

Figure 12:
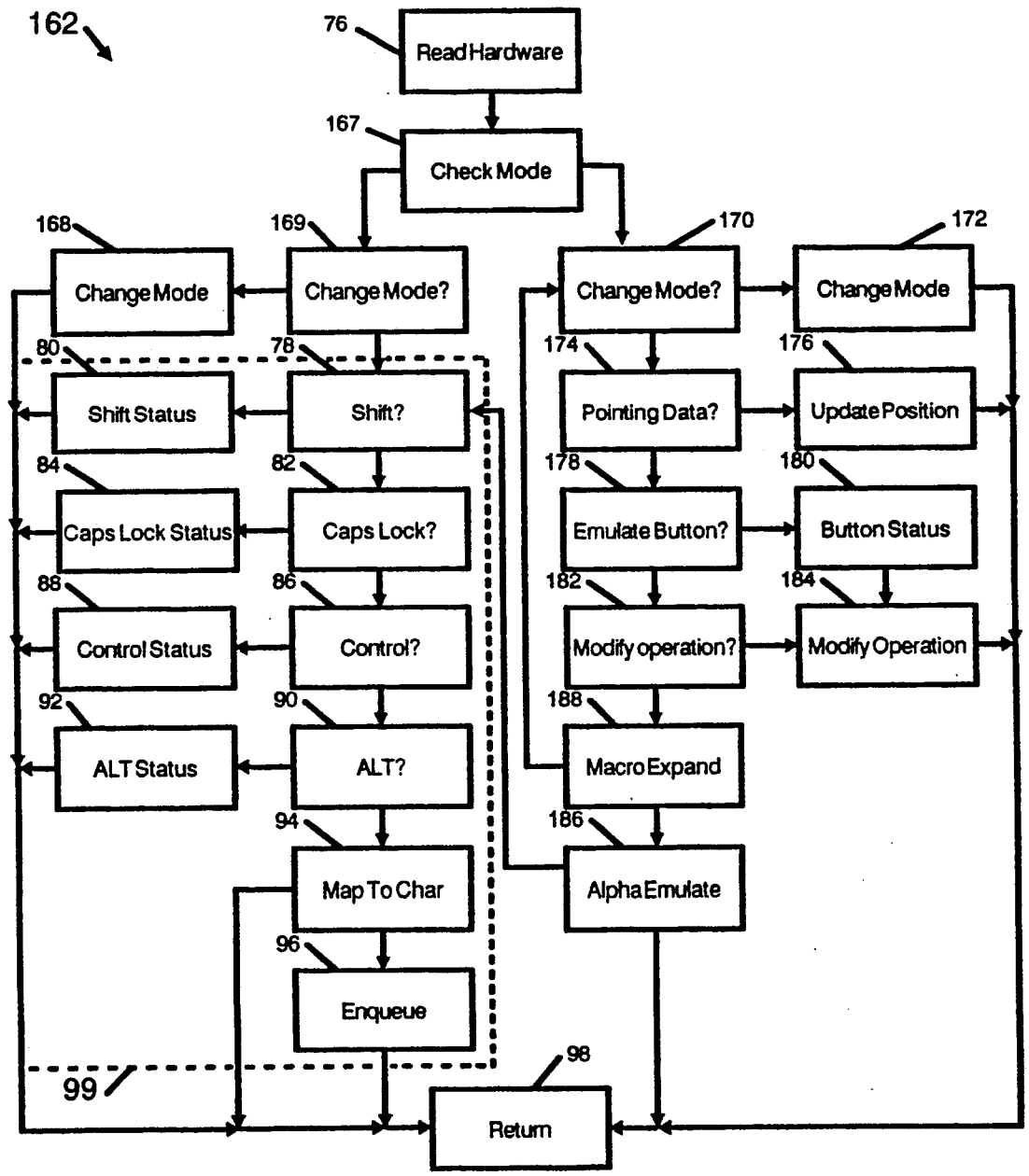
FIG. 12 is a flow chart of integrated interface software for implementing the integrated keyboard and pointing device of FIGS. 9–11.

It is certified that error appears in the above-identified patent and that said Letters Patent is hereby corrected as shown below:

| | |
|---|---|
| Column 3 | Line 38, change "(asdf-jkl;)" to --*(asdf-jkl;)*--; |
| Column 10 | Line 31, change "162 includes" to --162--; |
| Column 10 | Line 32, change "162" to --162 includes--; |
| Column 11 | Line 8, change "FIG. 2" to --FIG. 12--; |
| Column 11 | Line 24, change "FIG." to --FIG. 11--; |
| Column 15 | Line 21, change "lock" to --look--; |
| Column 17 | Claim 1, Line 48, change "point" to --pointing--; |
| Column 17 | Claim 1, Line 48, change "informtaion" to --information--; |

UNITED STATES PATENT AND TRADEMARK OFFICE
CERTIFICATE OF CORRECTION

PATENT NO. : 5,124,689
DATED : June 23, 1992
INVENTOR(S) : Franz et al

It is certified that error appears in the above-identified patent and that said Letters Patent is hereby corrected as shown below:

| | |
|---|---|
| Column 17 | Claim 1, Line 58, change "point" to --pointing--; |
| Column 18 | Claim 1, Line 1, change "keyswtiches," to --keyswitches--; |
| Column 18 | Claim 1, Line 1, change "pointed" to --pointing--; |
| Column 18 | Claim 1, Line 2, change "even" to --event--; |
| Column 18 | Claim 1, Line 14, change "effect" to --detect--. |

Signed and Sealed this

Thirty-first Day of August, 1993

*Attest:*

BRUCE LEHMAN

*Attesting Officer*  *Commissioner of Patents and Trademarks*